Figure 1:
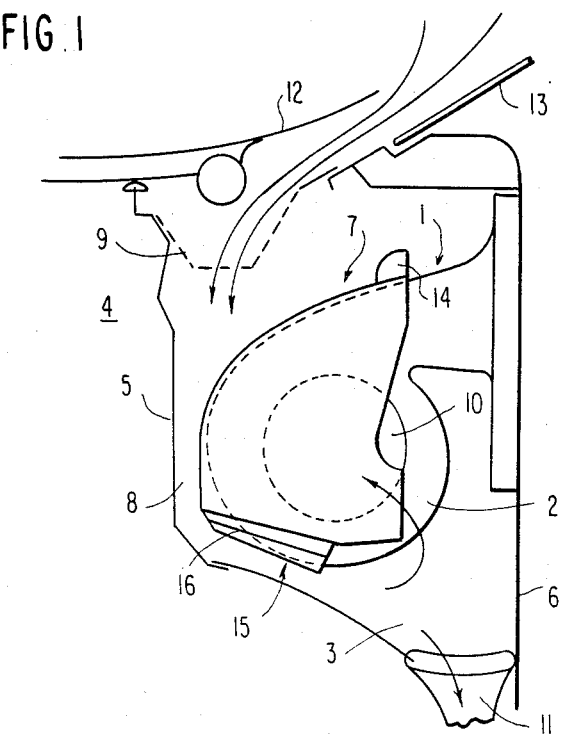

United States Patent [19]

Grimm et al.

[11] Patent Number: 4,563,942
[45] Date of Patent: Jan. 14, 1986

[54] EQUIPMENT PART COVERED BY A CASING AND HAVING A FAN

[75] Inventors: Hermann Grimm, Ostelsheim; Volkmar König; Gernot Karioth, both of Sindelfingen, all of Fed. Rep. of Germany

[73] Assignee: Daimler-Benz Aktiengesellschaft, Fed. Rep. of Germany

[21] Appl. No.: 436,704

[22] Filed: Oct. 25, 1982

[30] Foreign Application Priority Data

Oct. 27, 1981 [DE] Fed. Rep. of Germany ....... 3142484

[51] Int. Cl.[4] ............................................. B60H 1/28
[52] U.S. Cl. ..................................... 98/2.16; 98/2.07; 98/2.17
[58] Field of Search ............... 98/2, 2.05, 2.06, 2.07, 98/2.11, 2.16, 2.17; 415/219 R, 219 C

[56] References Cited

U.S. PATENT DOCUMENTS

| | | | |
|---|---|---|---|
| 2,355,501 | 8/1944 | Arnold | 98/2.07 |
| 2,510,790 | 6/1950 | Arnold | 98/2.17 X |
| 2,636,800 | 4/1953 | Downey | 312/297 X |
| 2,685,244 | 8/1954 | Wahlberg et al. | 98/2.17 X |
| 2,836,113 | 5/1958 | Seyfarth | 98/2.16 X |
| 3,867,064 | 2/1975 | Sorensen et al. | 415/219 C X |
| 4,437,393 | 3/1984 | Stolz et al. | 98/2.17 |

FOREIGN PATENT DOCUMENTS

| | | | |
|---|---|---|---|
| 2941183 | 4/1981 | Fed. Rep. of Germany | 98/2.11 |
| 1269732 | 7/1961 | France | 98/2 |
| 164808 | 10/1982 | Japan | 98/2 |
| 172814 | 10/1982 | Japan | 98/2 |

Primary Examiner—Harold Joyce
Attorney, Agent, or Firm—Craig and Burns

[57] ABSTRACT

A casing for an equipment part, both casing and part being accommodated in a space located between the engine compartment or boot and the splash wall of a motor vehicle, the portion of the casing surrounding the equipment part from below, or its connection to the remaining casing being designed to be movable, in such a way that, when the casing is installed or removed for maintenance, for example, the lower portion yields temporarily changing its shape and then assumes its initial shape again.

9 Claims, 4 Drawing Figures

EQUIPMENT PART COVERED BY A CASING AND HAVING A FAN

The invention relates to a casing for an equipment part, the equipment part having for instance a fan, of a heating, ventilation and/or air-conditioning system for a motor vehicle, the equipment part being accommodated in a space located between the engine compartment or trunk and the splash wall and the casing surrounding the equipment part from below forming, together with the wall of the space on the same side as the engine compartment or trunk, a channel through which fresh air, being deflected, is supplied to an air-inflow orifice in the equipment part.

An equipment part arranged and covered in this way is known from German Offenlegungsschrift No. 3,023,236, and in this the casing is provided with a cover so that access to the fan is provided if required. Because of the confined conditions of space, it is difficult to reach the lower connecting parts between the cover and the remaining casing. Moreover, it is not possible with absolute certainty to ascertain whether the replaced cover fits in a leak-proof manner all round, with the possible result that penetration of water may not be excluded.

The invention contemplates configuring the casing with minimum expense so that while maintaining the installation space unchanged and good water separation properties, the casing can easily be removed without the aid of tools and can be reinstalled in a manner so that penetration of water is prevented.

A casing of the type mentioned in the introduction to cover an equipment part having a fan, is therefore proposed, and, according to the invention, a portion of the casing itself, which surrounds the equipment part from below, or its connection with the remaining casing is designed to be movable, in such a way that, when the casing is installed or removed, its lower portion yields resiliently and then, after being fitted or removed respectively, assumes its original shape again.

The lower portion can be connected in one piece to the remaining casing, but it can also be a separate constructional part connected to the remaining casing.

An object of the invention is therefore a new and improved equipment housing.

Another object of the invention is a new and improved equipment housing wherein initial installation and removal for maintenance are facilitated.

A further object of the invention is a new and improved equipment housing having at least an extensible member for facilitating installation and removal.

Another object of the invention is an equipment part, covered by a casing and having a fan of a heating, ventilation and/or air conditioning system for a motor vehicle, the equipment part being accommodated in a space located between the engine compartment or trunk and the splash wall, the casing surrounding the equipment part from below forming together with a wall of the space on the same side as the engine compartment or trunk, a channel through which fresh air, being deflected, is supplied to an air-inflow orifice in the equipment part, wherein a portion of the casing itself which surrounds the equipment part from below, or its connection with the remaining casing is designed to be movable in such a way that when the casing is attached or detached, its lower portion yields resiliently and then, after being fitted or removed respectively, assumes its original shape again.

Another object of the invention is the configuring of a casing with a minimum of expense so that while maintaining the installation space unchanged, and good water separation properties, the casing can easily be removed without the aid of tools and can be reinstalled in a manner so that the penetration of water is prevented.

Figure 2:
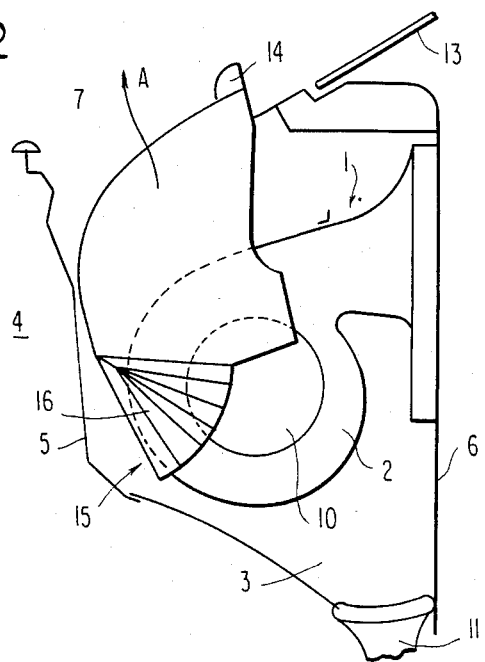
Figure 3:
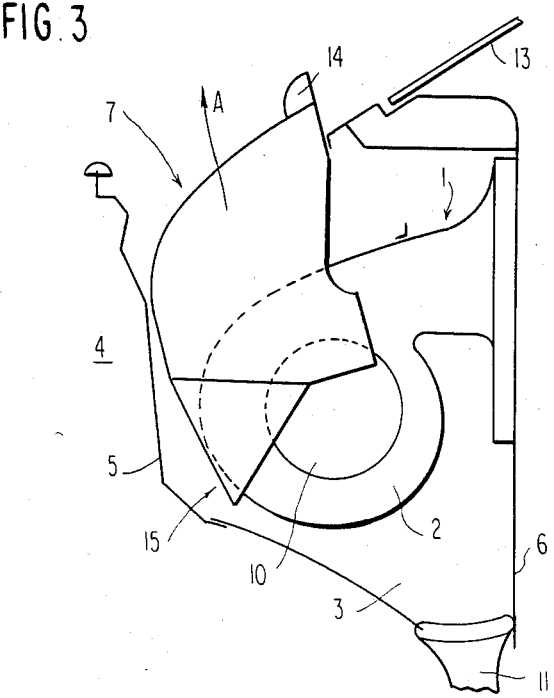
Figure 4:
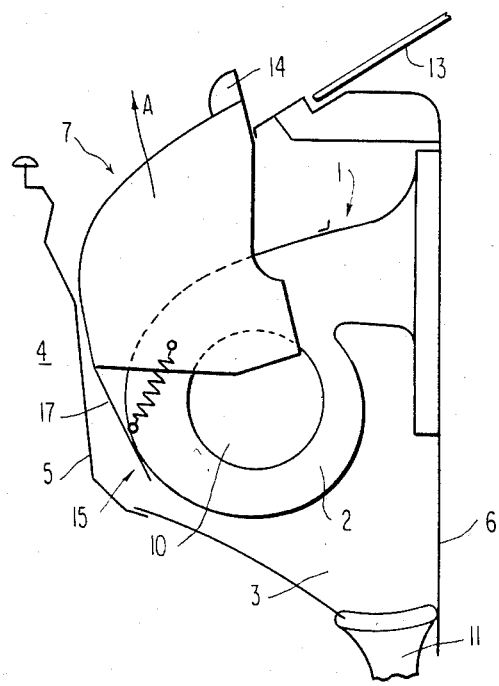

These and other objects, features and advantages of the present invention will become more apparent from the following description when taken in connection with the accompanying drawings which show, for the purposes of illustration only, plural embodiments in which FIG. 1 shows an equipment part which has a fan and is covered by a casing and the lower portion of which is designed as a bellows, FIG. 2 shows the arrangement according to FIG. 1 in a stage of removal, FIG. 3 shows a representation according to FIG. 1, the lower portion consisting of highly extensible material, and FIG. 4 shows a further representation corresponding to FIGS. 2 and 3, with a lower portion formed by a flap.

An equipment part 1 which has at least one fan 2 is accommodated in a space 3 formed essentially by a wall 5 limiting the engine compartment or trunk 4 and by the splash wall 6. The equipment part 1, which can, for example, also contain a filter in a way not shown, is attached releasably to the splash wall 6, while other components of a heating, ventilation and/or air conditioning system (not shown) may be located on the same side as the passenger compartment.

A casing 7 surrounds the equipment part 1 and, interacting with the wall 5, forms a channel 8 (FIG. 1) in which fresh air entering through a grating 9 is supplied, deflected and with water being separated, to an air inflow orifice 10. The separated moisture is conveyed away through a flow off 11 located at the lowest point of the space 3 and preventing the inflow of additional air. A cowl 12 covers the space 3 towards the top and leaves free only an air-inflow slit towards the windshield 13 (FIG. 1).

As shown in FIGS. 2—4, after the cowl 12 has been swung away and the grating 9 removed, the casing 7 is accessible from above and can be grasped by a handle 14 indicated and pulled off in the direction of the arrow "A". This movement of pulling off the casing 7 which also surrounds the equipment part 1 from below is made possible because the casing has a lower portion 15 which yields resiliently.

In the exemplary embodiments according to FIGS. 1 and 2, this portion 15 is formed by a bellows 16, according to FIG. 3 is an especially resilient region and according to FIG. 4 consists of a spring loaded flap 17. The bellows 16 (FIGS. 1 and 2) and the especially resilient region according to FIG. 3 can be integral parts of the casing 7 or else can also be separate parts.

When the casing 7 is removed, maintenance and repair work can be carried out easily, and the casing 7 can subsequently be reinstalled and secured, the lower portion 15 always yielding briefly in the above-described way, then assuming its original shape again.

While we have shown and described plural embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. Apparatus for a motor vehicle having an equipment part having at least one of a fan, a heating, ventilation and air conditioning system, the equipment part being accommodated in a space located between one of an engine compartment and a trunk and a splash wall, and a casing means surrounding the equipment part for deflecting water from entry into the equipment and forming, together with a wall of the space on the same side as the engine compartment or trunk, a channel through which fresh air only is supplied to an air-inflow orifice in the equipment part, comprising second means surrounding the equipment part at least from below, and having at least one dimension variable in magnitude for yielding during installation and during removal of the casing means and connected to the casing means for maintaining the casing means in its water deflecting condition after installation of the casing means.

2. Apparatus according to claim 1, wherein
the second means as one piece is connected to the casing means.

3. Apparatus according to claim 1, wherein
the second means is a separate construction part connected to the casing means.

4. Apparatus according to claim 3, wherein
the second means is formed by a flap to be opened against a spring force.

5. Apparatus for a motor vehicle having an equipment part having at least one of a fan, a heating, ventilation and air conditioning system, the equipment part being accommodated in a space located between one of an engine compartment and a trunk and a splash wall, and a casing means surrounding the equipment part for deflecting water from entry into the equipment and forming, together with a wall of the space on the same side as the engine compartment or trunk, a channel through which fresh air only is supplied to an air-inflow orifice in the equipment part, comprising second means connected to the casing means and surrounding the equipment part at least from below and having at least one dimension variable in magnitude for yielding to admit installation and removal of the casing means and wherein the second means comprises a bellows.

6. Apparatus according to one of claims 1, 2, 3 or 4, wherein
the second means comprises resilient highly extensible material.

7. Apparatus for a motor vehicle having an equipment part having at least one of a fan, a heating, ventilation and air conditioning system, the equipment part being accommodated in a space located between one of an engine compartment and a trunk and a splash wall, and a casing means surrounding the equipment part for deflecting water from entry into the equipment and forming, together with a wall of the space on the same side as the engine compartment or trunk, a channel through which fresh air only is supplied to an air-inflow orifice in the equipment part, comprising second means surrounding the equipment part at least from below and having at least one dimension variable in magnitude for yielding to admit installation and removal of the casing means wherein the second means as one piece is connected to the casing means, and comprises a bellows.

8. Apparatus for a motor vehicle having an equipment part having at least one of a fan, a heating, ventilation and air conditioning system, the equipment part being accommodated in a space located between one of an engine compartment and a trunk and a splash wall, and a casing means surrounding the equipment part for deflecting water from entry into the equipment and forming, together with a wall of the space on the same side as the engine compartment or trunk, a channel through which fresh air only is supplied to an air-inflow orifice in the equipment part comprising second means surrounding the equipment part at least from below and having at least one dimension variable in magnitude for yielding to admit installation and removal of the casing means, wherein the second means is a separate construction part connected to the casing means and comprises a bellows.

9. Apparatus for a motor vehicle having an equipment part having at least one of a fan, a heating, ventilation and air conditioning system, the equipment part being accommodated in a space located between one of an engine compartment and a trunk and a splash wall, and a casing means surrounding the equipment part for deflecting water from entry into the equipment and forming, together with a wall of the space on the same side as the engine compartment or trunk, a channel through which fresh air only is supplied to an air-inflow orifice in the equipment part, comprising second means surrounding the equipment part at least from below and having at least one dimension variable in magnitude for yielding to admit installation and removal of the casing means, wherein the second means is a separate construction part connected to the casing means and formed by a flap to be opened against a spring force, the second means comprising a bellows.

* * * * *